United States Patent [19]

Edgar et al.

[11] Patent Number: 5,406,070
[45] Date of Patent: Apr. 11, 1995

[54] METHOD AND APPARATUS FOR SCANNING AN OBJECT AND CORRECTING IMAGE DATA USING CONCURRENTLY GENERATED ILLUMINATION DATA

[75] Inventors: Albert D. Edgar, Austin; Steven C. Penn, Georgetown, both of Tex.

[73] Assignee: International Business Machines Corporation, Armonk, N.Y.

[21] Appl. No.: 168,700

[22] Filed: Dec. 16, 1993

[51] Int. Cl.[6] .......................................... H04N 5/253
[52] U.S. Cl. .................................. 250/208.1; 250/205
[58] Field of Search ............... 250/208.1, 205, 214.6, 250/228; 358/461, 465, 475, 487, 901.1; 348/362, 364, 370, 97

[56] References Cited

U.S. PATENT DOCUMENTS

| | | |
|---|---|---|
| 307,031 | 10/1884 | Edison . |
| 4,620,236 | 10/1986 | Tanaka et al. . |
| 4,639,608 | 1/1987 | Kuroda . |
| 4,796,093 | 1/1989 | Asano . |
| 4,853,739 | 8/1989 | Miyamoto et al. . |
| 4,870,454 | 9/1989 | Kurusu et al. . |
| 4,931,866 | 6/1990 | Charlesworth et al. . |
| 4,952,972 | 8/1990 | Someya . |
| 4,961,117 | 10/1990 | Rumley . |
| 4,998,118 | 3/1991 | Ng . |
| 5,012,346 | 4/1991 | De Jager et al. ....................... 348/97 |
| 5,065,036 | 11/1991 | Cropper et al. . |
| 5,084,772 | 1/1992 | Shimoyama . |
| 5,155,596 | 10/1992 | Kurtz et al. ........................... 348/97 |
| 5,241,459 | 8/1993 | Kaplan et al. ....................... 250/228 |
| 5,274,228 | 12/1993 | Kaplan .............................. 250/227.31 |

FOREIGN PATENT DOCUMENTS

| | | |
|---|---|---|
| 63-180981 | 7/1988 | Japan . |
| 2168217 | 6/1990 | Japan . |

*Primary Examiner*—David C. Nelms
*Assistant Examiner*—John R. Lee
*Attorney, Agent, or Firm*—Paul S. Drake

[57] ABSTRACT

An apparatus for generating an image from an object including apparatus for using a first portion of a light sensor to generate image data of an object, apparatus for using a second portion of the light sensor to generate illumination data of an illumination source concurrently with the generation of image data by the first portion of the light sensor, and apparatus for correcting the generated image data using the concurrently generated illumination data. In addition, a method for generating an image from an object including the steps of using a first portion of a light sensor to generate image data of an object, using a second portion of the light sensor to generate illumination data of an illumination source concurrently with the generation of image data by the first portion of the light sensor, and correcting the generated image data using the concurrently generated illumination data.

15 Claims, 4 Drawing Sheets

METHOD AND APPARATUS FOR SCANNING AN OBJECT AND CORRECTING IMAGE DATA USING CONCURRENTLY GENERATED ILLUMINATION DATA

DESCRIPTION

1. Technical Field

This invention relates generally to scanning an object and more particularly to correction of light variation during scanning of the object.

2. Background of the Invention

Light sources used in scanning objects vary in brightness, color, and dispersion over time. These variations include rapid flutters of plasma discharge, path or filament oscillation, responses to environmental changes such as temperature, and aging of the light source and light sensor. When these light variations occur during a scan, such as in a line scanning device, waves are generated across the image. In addition, longer term variations result in inefficient use of dynamic capture range, drift and image quality.

Prior art scanners typically require the light source to be stable to avoid these problems. This results in expensive lamps and power supplies for expensive scanners and degraded images when economics require using less expensive lamps and power supplies. Prior art methods of stabilizing lamps include using more rigid filaments, preheating gas discharge bulbs for 10 minutes before a scan would begin, using temperature control ovens, using very stable power supplies, using multiple photocells, using feedback signals through the power supply, carefully designing lamps to limit plasma turbulence, and frequently recalibrating the equipment to compensate for aging.

3. Disclosure of the Invention

The present invention includes an apparatus for generating an image from an object including apparatus for using a first portion of a light sensor to generate image data of an object, apparatus for using a second portion of the light sensor to generate illumination data of an illumination source concurrently with the generation of image data by the first portion of the light sensor, and apparatus for correcting the generated image data using the concurrently generated illumination data. In addition, the present invention includes a method for generating an image from an object including the steps of using a first portion of a light sensor to generate image data of an object, using a second portion of the light sensor to generate illumination data of an illumination source concurrently with the generation of image data by the first portion of the light sensor, and correcting the generated image data using the concurrently generated illumination data.

A further understanding of the nature and advantages of the present invention may be realized by reference to the remaining portions of the specification and the drawings.

BEST MODE FOR CARRYING OUT THE INVENTION

This disclosure describes scanners used to scan various types of objects such as film and printed media. In the preferred embodiments, calibration scans and direct light sensing are used to compensate for object scanning variations caused by profile variations among pixels in the light sensor and by illumination variations of the light source.

Figure 1:
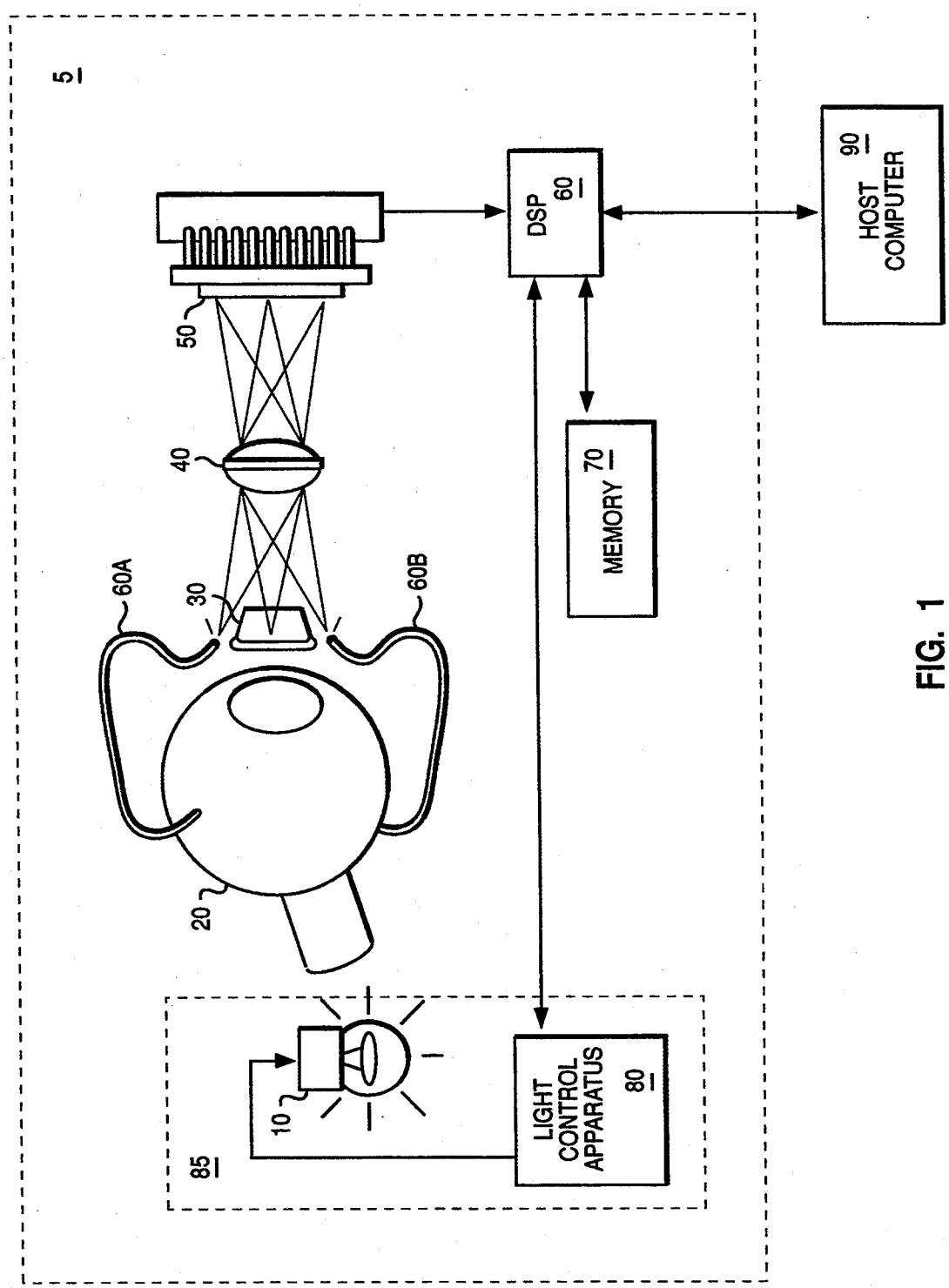
FIG. 1 is a diagram illustrating a film scanner according to a preferred embodiment of the invention.

FIG. 1 is a diagram illustrating a film scanner 5 according to a preferred embodiment of the invention. The film scanner includes a lamp 10 which produces light that is diffused in an integrating diffuser 20. The integrating diffuser then directs the light through a film 30 that is being scanned. In the preferred embodiment, the film is pulled through the scanning area, thereby allowing any length of film to be scanned. The light that passed through the film then passes through a lens 40 which focuses the image on a light sensor 50. In the preferred embodiment, the light sensor is a grayscale or color CCD (charge-coupled device) that is many pixels high and a few pixels wide. This allows the CCD to scan the entire height of the film at once, but only a narrow width of the film at a time. The entire width of the film is scanned as the film is pulled through the scanner. In the preferred embodiment, some of the light from the lamp is passed around the film by optical fibers 60A and 60B. The optical fibers are aimed so that the light is directed to pass through lens 40 and is focused on sensor 50 in an area of the sensor not used for imaging the scanned film. In the preferred embodiment, this rerouted light is from the same integrated mix of all the light coming from the lamp that illuminates the film. In addition, the rerouted light is typically not bright, but is attenuated to match the light attenuated by the film. Although in the preferred embodiment optical fiber are utilized to reroute some of the light from the lamp, alternative embodiments may use other types of rerouting including mirror assemblies or the like.

Light sensor 50 then provides pixel data signals to DSP (Digital Signal Processor) 60. The DSP then uses the pixel data signals to store data representing an image of the scanned film in memory 70. The DSP may also communicate with a host computer 90 such as to provide image information to the host computer. The DSP may also control or send signals to a light assembly 85 if the light is determined to exceed predetermined ranges. Light assembly 85 includes a light control apparatus 80 and lamp 10. Light control apparatus 80 may include a power supply and other circuitry to very the amount of light provided to lamp 10. In an alternative embodiment, ambient light may be used such that light apparatus 85 is not needed.

Figure 2:
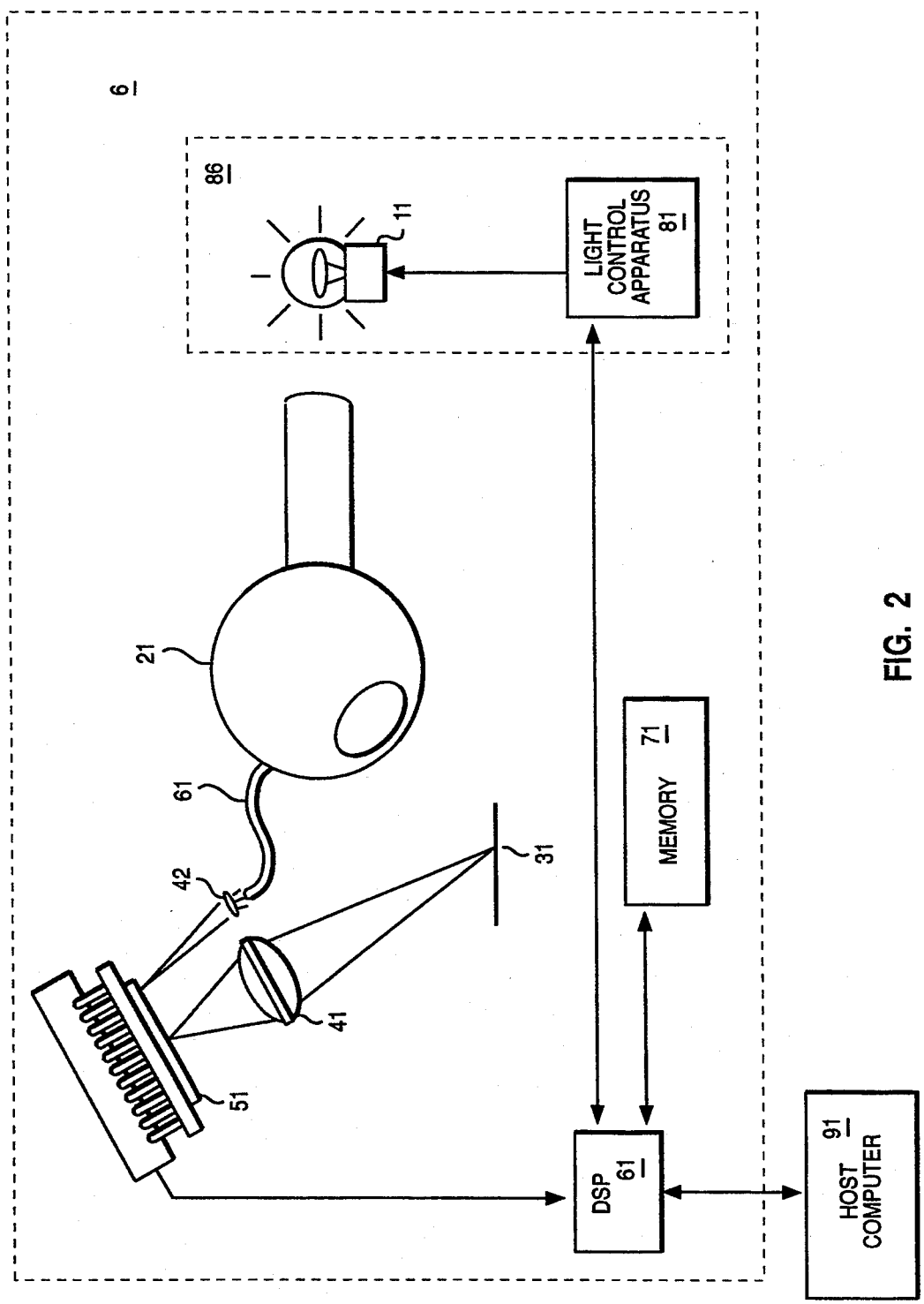
FIG. 2 is a diagram illustrating a print media scanner according to a preferred embodiment of the invention.

FIG. 2 is a diagram illustrating a print media scanner 6 according to a preferred embodiment of the invention. The print media scanner includes a lamp 11 which produces light that is diffused in a integrating diffuser 21. The integrating diffuser then directs the light onto a print media 31 that is being scanned. In the preferred embodiment, the print media is moved relative to the scanning area, thereby allowing any length of print media to be scanned. The light that reflects off the print media then passes through a lens 41 which focuses the image on a light sensor 51. In the preferred embodiment, the light sensor is a grayscale or color CCD that is many pixels high and a few pixels wide. This allows the CCD to scan the entire height of the print media at once, but only a narrow width of the print media at a time. The entire width of the print media is scanned as the print media is moved relative to the light sensor. In the preferred embodiment, some of the light from the lamp is passed around the print media by optical fiber 61. The optical fiber is aimed so that the light is directed to pass through a lens 42 and is focused on sensor 51 in an area of the sensor not used for imaging the scanned print media. In the preferred embodiment, this rerouted light is from the same integrated mix of all the light coming from the lamp that illuminates the print media. In addition, the rerouted light is typically not bright, but is attenuated to match the light attenuated by the print media. Although in the preferred embodiment optical fibers are utilized to reroute some of the light from the lamp, alternative embodiments may use other types of rerouting including mirror assemblies or the like.

Light sensor 51 then provides pixel data signals to a DSP (Digital Signal Processor) 61. The DSP then uses the pixel data signals to store data representing an image of the scanned print media in memory 71. The DSP may also communicate with a host computer 91 such as to provide image information to the host computer. The DSP may also control or send signals to a light assembly 86 if the light is determined to exceed predetermined ranges. Light assembly 86 includes a light control apparatus 81 and lamp 11. Light control apparatus 81 may include a power supply and other circuitry to vary the amount of light provided to lamp 11. In an alternative embodiment, ambient light may be used such that light apparatus 86 is not needed, such as in a hand scanner without an internal light source.

As a result of the above described embodiments of the invention, the light sensor senses both the image of the film or print media from the light passing through the film or light reflecting off the print media and the rerouted light that did not pass through the film or reflect off the print media. Therefore, any time-response or frequency variation of lamp fluctuations should affect each light measurement about equally. Also, since the same sensor sees both the attenuated or reflected light and the redirected light, any variation in lamp color and intensity should also affect each light measurement equally. Even variations in the sensor itself should affect all concurrent light measurements equally. Thus, unlike the prior art solution of a separate sensor being used to feed back sensed light variations to the power supply, brightness variations are sensed with minimal time lag, color or intensity variances. In addition, variations within the light sensor itself due to temperature, voltage, or any other factors are included so that the variables may be corrected.

The voltage scan from the CCD sensor is typically linear with respect to illumination. Thus, by dividing the light measured by each pixel viewing the film or exposed surface, by the light measured from that passed around the film or exposed surface, the variation in the lamp and sensor may be corrected. This will be described in greater detail below with respect to FIG. 4.

Figure 3:
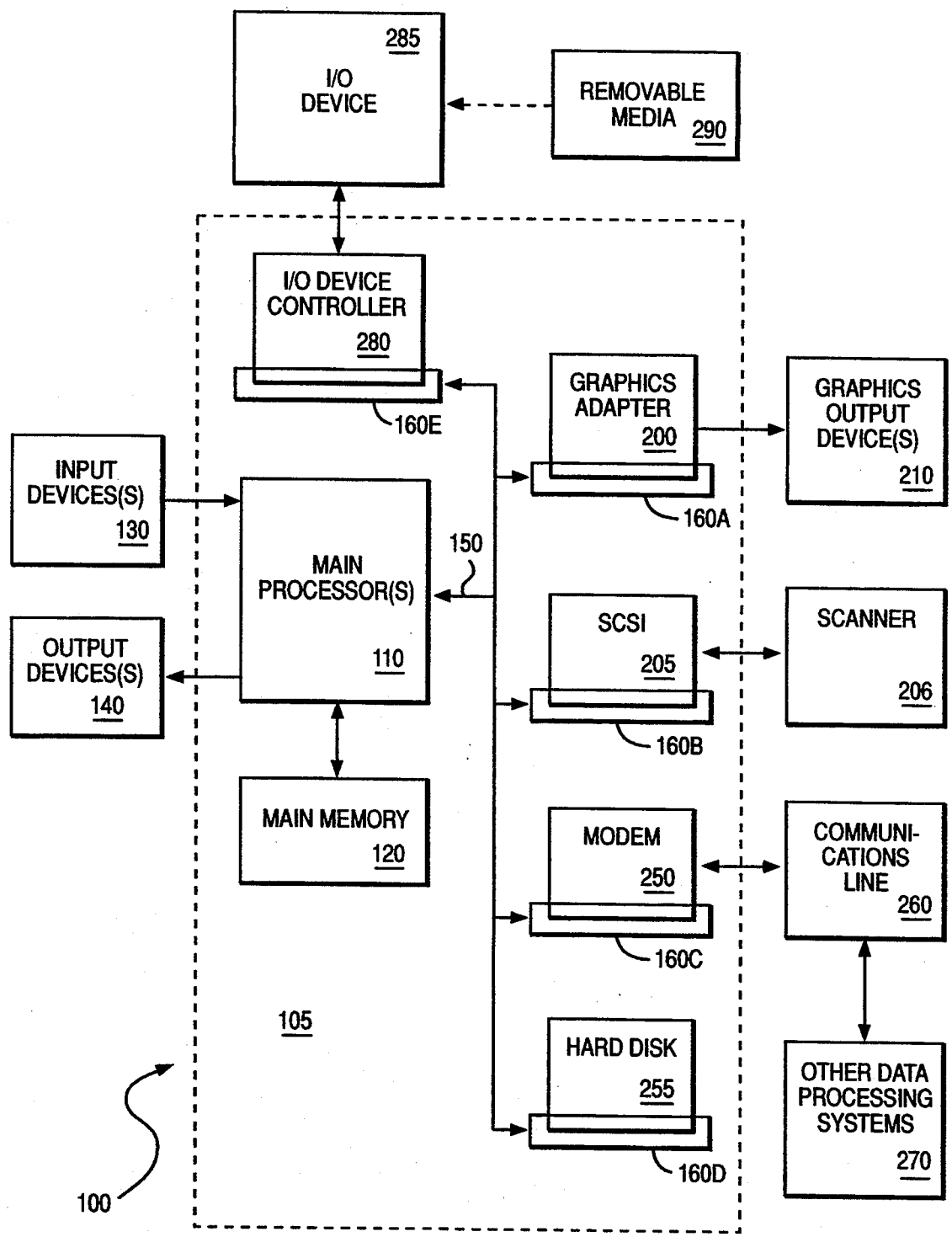
FIG. 3 is a block diagram of a typical digital computer utilized by a preferred embodiment of the invention.

FIG. 3 is a block diagram of a typical digital computer 100 that may be utilized by a preferred embodiment of the invention. The computer includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor. A scanner 206 may be coupled to a SCSI adapter 205 located in slot 160B. The scanner may be coupled to the host computer in other ways such as through a parallel or serial port. A modem or other communications adapter 250 and a hard disk 255 may also be located in slots 160C and 160D to provide communications with main processor 110 across bus 150. Modem 250 may communicate with other data processing systems 270 across communications line 260. Computer readable removable media 290, such as a magnetic diskette or a compact disc, may be inserted into an input/output device 285, such as a disk drive or a CD-ROM (compact disc—read only memory) driver. Data is read from or written to the removable media by the I/O device under the control of the I/O device controller 280. The I/O device controller communicates with the main processor through slot 160E across bus 150. Main memory 120, hard disk 255 and removable media 290 are all referred to as memory for storing data for processing by processor 110.

Figure 4:
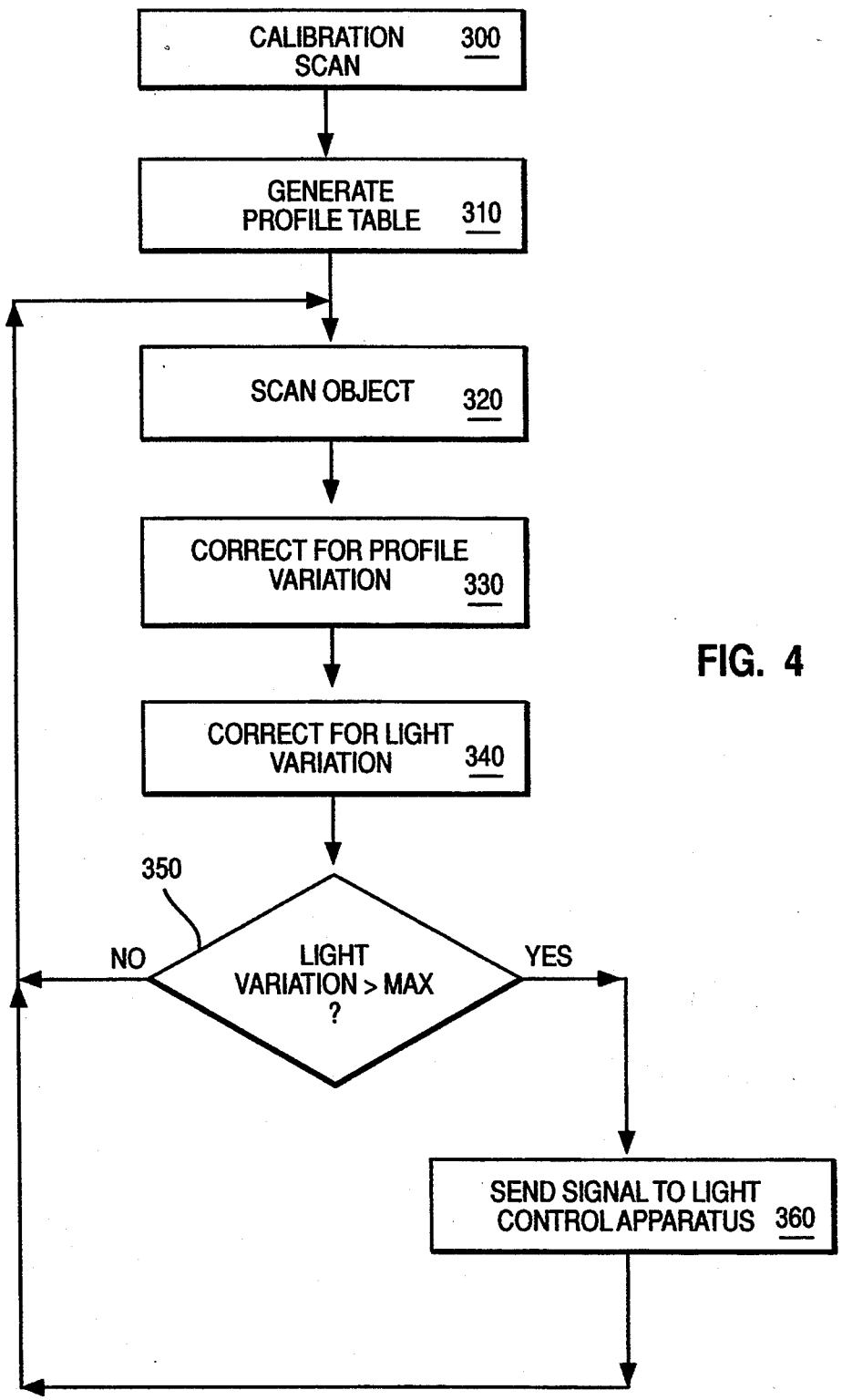
FIG. 4 is a flowchart illustrating the operation of the film or print media scanners described above.

FIG. 4 is a flowchart illustrating the operation of the film or print media scanners described above. In a first step 300 a calibration scan is performed to determine an average brightness of the lamp and to determine a profile of the sensitivity of the various pixels on the light sensor. For a film scanner, this calibration scan is preferably performed with no film in the device. In a printed media scanner, the calibration is preferably performed without any media but with a reflective surface in its place. In step 310, a profile table is generated by the DSP and stored in memory. In the preferred embodiment, this profile table includes a value for each pixel of the light sensor. The stored value is preferably the reciprocal of the average value determined by that pixel during the calibration scan.

In the preferred embodiment, the average value for a pixel P with n samples taken would be:

$$P_{avg} = [(P_1 + P_2 + P_3 + \ldots + P_n)/n];$$

with the reciprocal value stored in the profile table in memory being:

$$P'_{avg} = [n/(P_1 + P_2 + P_3 + \ldots + P_n)]$$

with each value of P being the value detected by that pixel being calculated at time n during the calibration scan. In addition, a multiplier is provided for the pixels that are directly illuminated by the light through the fiber optic cables. In the preferred embodiment, the average value of the illumination pixels I with n samples taken of m different pixels which is stored in memory would be:

$$I_{avg} = (I_{1,1} + I_{1,2} + \ldots + I_{2,1} + \ldots + I_{m,n})/(m*n);$$

with each value of I being the value detected by any pixel m of the pixels illuminated by the optical fibers at time n during the calibration scan. As a result, a set of multipliers are stored for use in subsequent scanning of objects (film, print media, etc.) as described below.

In step 320, a first portion of the object is scanned. In step 330, each of the pixel values provided by the light sensor are then multiplied by the associated multiplier stored in the profile table in memory. As a result, the resulting value will have eliminated any variations caused by profile variations in the light sensor. Assuming a vertical sensor array, this will prevent the resulting scan image from having horizontal lines caused by the profile variations of the light sensor as the object is moved horizontally through the scanner. In the preferred embodiment, the value of a specific pixel P at time t is equal to $P_t$ which is multiplied by the associated profile multiplier value to obtain:

$$P'_t = P_t * P_{avg}.$$

Next, correcting for variations in lamp intensity in step 340, the reciprocal of the average value of pixels I illuminated through the optical fiber at time t is equal to:

$$I_{m,t} = m/[I_{1,t} + I_{2,t} + I_{3,t} + \ldots + I_{m,t}];$$

which is multiplied by the profile multiplier to obtain:

$$I'_{m,t} = I_{m,t} * I_{avg}.$$

Please note that $I'_{m,t}$ would be equal to 1 if the lamp illumination has not varied.

Continuing with step 340, the values from step 330 are multiplied by the corrective variation of light to correct any image variations caused by variations of the lamp illumination. This will eliminate any vertical lines caused by the lamp variations as the film or print media is moved horizontally through the scanner. In the preferred embodiment, the value of each pixel X at time t multiplied by the multiplier $P'_{avg}$ is equal to $X'_t$ which is multiplied by the lamp illumination multiplier to obtain:

$$P''_t = P'_t * I_{m,t} = P_t * P_{avg} * I_{m,t} * I_{avg}.$$

As a result of steps 330 and 340, the resulting image is virtually free of image variations caused by profile variations in the light sensor and by illumination variations caused by the lamp or sensor.

In step 350 it is determined whether the light variation is greater than a maximum predetermined value. If not, then processing returns to step 320 to scan a second portion of the object. If yes, then in step 360 the signal is sent to the light control apparatus to modify the amount of light being provided by the lamp. If $I'_{m,t}$ is greater than 1, the lamp intensity should be increased, else it should be decreased. This process is continued until the whole object is scanned. Of course, this step may be skipped if ambient light is being used to scan the object.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for generating an image from an object comprising:
   means for using a first portion of a light sensor to generate image data of an object;
   means for using a second portion of the light sensor to generate illumination data of an illumination source concurrently with the generation of image data by the first portion of the light sensor; and
   means for correcting the generated image data using the concurrently generated illumination data.

2. The apparatus of claim 1 further comprising means for computing a standard intensity of the illumination source.

3. The apparatus of claim 2 wherein the means for correcting includes further correcting the generated image data using the standard intensity of the illumination source.

4. The apparatus of claim 3 wherein the means for computing includes computing a sensitivity profile of the light sensor.

5. The apparatus of claim 4 wherein the means for correcting includes further correcting the generated light data using the computed sensitivity profile of the light sensor.

6. An data processing system for generating an image from an object comprising:
   a) a scanner including:
      i) means for using a first portion of a light sensor to generate image data of an object; and
      ii) means for using a second portion of the light sensor to generate illumination data of an illumination source concurrently with the generation of image data by the first portion of the light sensor;
   b) a memory for storing data to be processed; and
   c) a processor for processing data, said processing including means for correcting the generated image data using the concurrently generated illumination data.

7. The data processing system of claim 6 wherein the processor further includes means for computing a standard intensity of the illumination source.

8. The data processing system of claim 7 wherein the processor further includes means for correcting the generated image data using the standard intensity of the illumination source.

9. The data processing system of claim 8 wherein the processor further includes means for computing a sensitivity profile of the light sensor.

10. The data processing system of claim 9 wherein the processor further includes means for correcting the generated light data using the computed sensitivity profile of the light sensor.

11. A method for generating an image from an object comprising the steps of:
    using a first portion of a light sensor to generate image data of an object;
    using a second portion of the light sensor to generate illumination data of an illumination source concurrently with the generation of image data by the first portion of the light sensor; and
    correcting the generated image data using the concurrently generated illumination data.

12. The method of claim 11 further comprising a step of computing a standard intensity of the illumination source.

13. The method of claim 12 wherein the step of correcting includes further correcting the generated image data using the standard intensity of the illumination source.

14. The method of claim 13 wherein the step of computing includes computing a sensitivity profile of the light sensor.

15. The method of claim 14 wherein the step of correcting includes further correcting the generated light data using the computed sensitivity profile of the light sensor.

* * * * *